Figure 1:
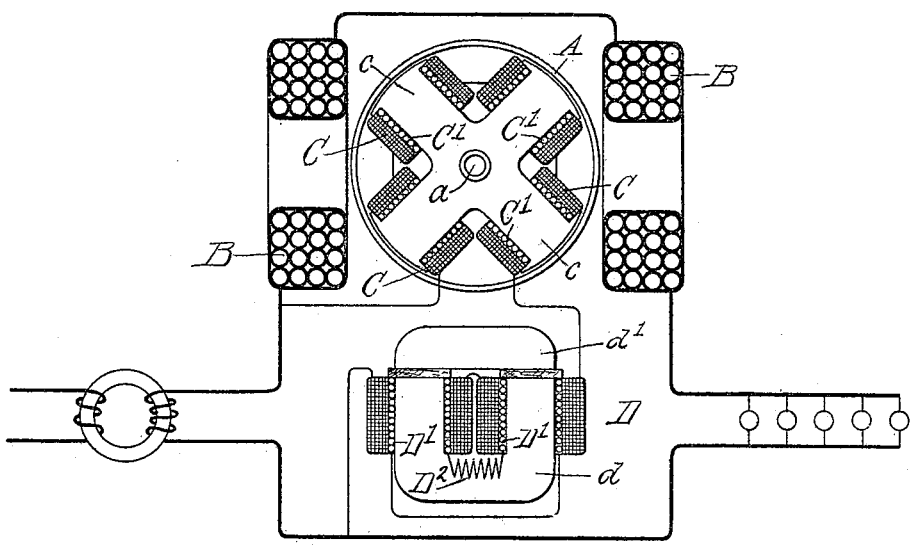

No. 623,521. Patented Apr. 25, 1899.
T. DUNCAN.
ELECTRIC METER.
(Application filed Jan. 19, 1898.)

(No Model.) 3 Sheets—Sheet 1.

Witnesses
Samuel R. Bachtel
E. P. White

Inventor
Thomas Duncan
By his Attorneys
Carter & Graves

No. 623,521.  
T. DUNCAN.  
ELECTRIC METER.  
(Application filed Jan. 19, 1898.)  
Patented Apr. 25, 1899.

(No Model.) 3 Sheets—Sheet 2.

Witnesses  
Samuel A. Bachtel.  
E P White.

Inventor  
Thomas Duncan  
By his Attorneys  
Carter & Graves

No. 623,521. Patented Apr. 25, 1899.
T. DUNCAN.
ELECTRIC METER.
(Application filed Jan. 19, 1898.)

(No Model.) 3 Sheets—Sheet 3.

Witnesses
Samuel R. Bachtel
E P White

Inventor
Thomas Duncan.
By his Attorneys
Carter & Graves

THE NORRIS PETERS CO., PHOTO-LITHO., WASHINGTON, D. C.

UNITED STATES PATENT OFFICE.

THOMAS DUNCAN, OF FORT WAYNE, INDIANA.

ELECTRIC METER.

SPECIFICATION forming part of Letters Patent No. 623,521, dated April 25, 1899.

Application filed January 19, 1898. Serial No. 667,131. (No model.)

*To all whom it may concern:*

Be it known that I, THOMAS DUNCAN, of Fort Wayne, in the county of Allen and State of Indiana, have invented certain new and useful Improvements in Electric Meters, of which the following is a specification.

This invention relates to induction-motor meters for alternating electric currents, and has for its object to provide an improved instrument of this character which will be accurate under all conditions of service and especially under either inductive or non-inductive loads.

Meters of the class under consideration depend for their actuating torque upon the inductive influence upon an armature of the resultant shifting field due to the combined action of volt and series coils energized by currents which differ in phase. The difference in phase is commonly produced by advancing or retarding the current in the volt or shunt coil circuit with respect to the impressed electromotive force of the work-circuit, and in order that the meter shall be accurate under changing conditions of load inductance the phase displacement thus obtained must be approximately ninety degrees, for reasons now generally understood by those familiar with this art. In the form of meter more particularly herein set forth the current in the shunt-circuit is retarded by an impedance-coil and generally also by the self-inductance of the volt-coil. It is, however, difficult or impossible to obtain the required lag of ninety degrees in this manner, and a principal feature of the present invention consists in employing a secondary volt-coil, closed upon itself, in connection with the primary volt-coil, which is connected across the line, to produce a resultant flux or field that will be equivalent in its effect upon the armature to the action that the primary volt-coil alone would have if actuated by a current lagging the full ninety degrees. The effect of introducing such closed secondary may be explained as follows: Let it be assumed, for example, that the lag of the current in the primary volt-coil is forty-five degrees. The current in the secondary volt-coil will be ninety degrees behind the primary current in phase and will therefore lag one hundred and thirty-five degrees behind the impressed electromotive force of the work-circuit. The resultant inductive effect of the two coils upon the armature, supposing the primary and secondary to be equal, will then be the same as that of a single coil energized by a current lagging an amount equal to the average lag of such primary and secondary currents or, in other words, by ninety degrees. In convenient practice, however, it is frequently found that this average lag will exceed ninety degrees, and to provide for such cases I employ a secondary impedance-coil closed upon itself, usually through a non-inductive resistance, in connection with the impedance-coil, for the purpose of producing a reaction on the latter sufficient to reduce the lag of the current in the primary volt-circuit to the extent necessary to bring down the resultant lag to the ninety degrees desired. The resistance through which the secondary of the impedance-coil is closed is furthermore desirably made adjustable, so that the exact required effect may be approximated with great nicety.

The invention consists in the matters herein set forth and particularly pointed out in the appended claims when considered in connection with the accompanying drawings, which show my improvements as applied as an example to a few of the many possible designs of induction-meters.

In the accompanying drawings, Figure 1 is a diagrammatic view of a meter constructed in accordance with my invention. Figs. 2, 3, 4, 5, and 6 are diagrammatic views of constructions of meter somewhat modified in various particulars from that shown in Fig. 1.

In Fig. 1 of said drawings, A designates the rotary armature; $a$, its supporting-spindle; B, the field-coils, which are connected in series in the work-circuit, and C the volt-coils, which are connected in a shunt-circuit between the main lead of the work-circuit. As shown in this figure, said volt-coils are four in number and are located within the armature A upon the four poles of a cross-shaped magnetic core $c$. An inductance-coil D, having a magnetic core $d$, is also connected in said shunt-circuit to retard the phase of the current therein.

$C'$ $C'$ designate closed secondary coils provided in connection with the primary volt-coils C and consisting in this instance of a comparatively few turns of relatively heavy wire wound upon the ends of the core $c$ within the coils C. In much the same manner secondary coils D', herein shown as closed through a resistance $D^2$, are provided upon the poles of the core $d$ within the impedance-coils D. Without this secondary impedance-coil the induced current set up in the secondary volt-coil, together with the primary current of the shunt-circuit, would produce a resultant field having in effect a phase displacement that under ordinary circumstances would be in excess of the ninety degrees required, and the purpose and effect of the secondary impedance-coil is simply to reduce the retarding effect of the impedance-coil proper, and to thus insure against such excess of lag.

Figure 2:
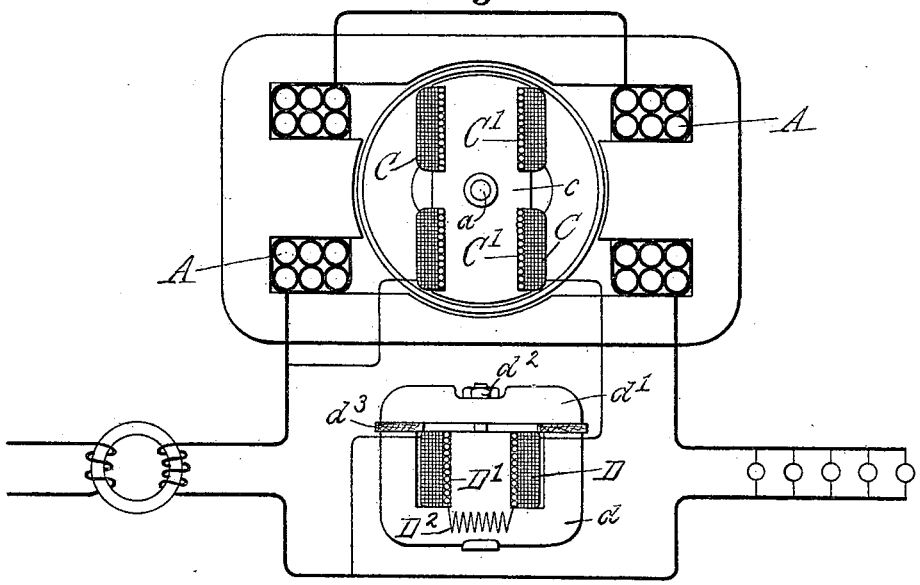
Figure 3:
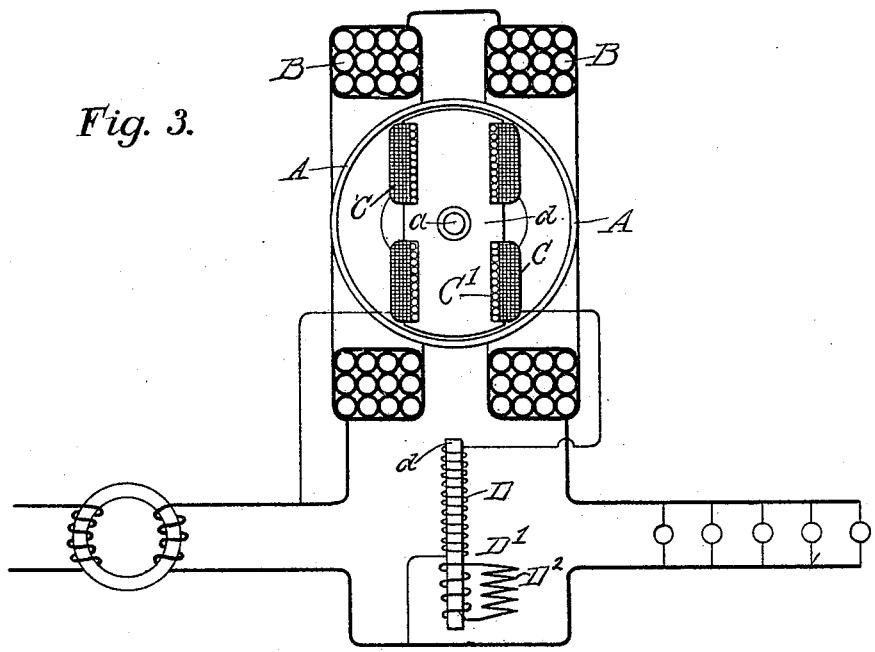
Figure 4:
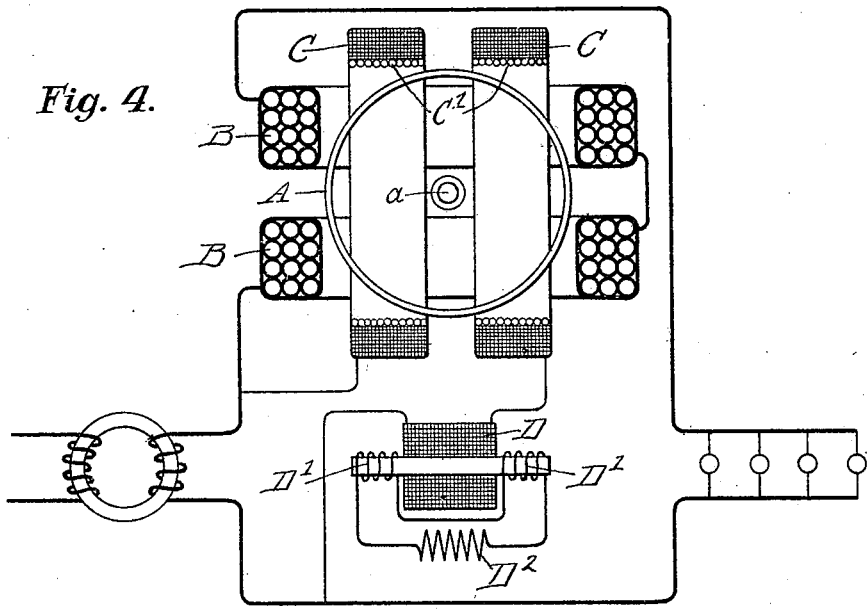
Figure 5:
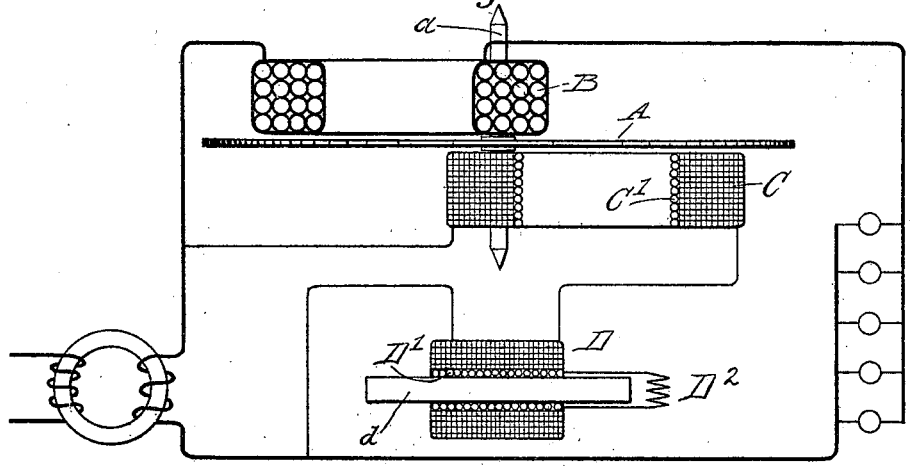
Figure 6:
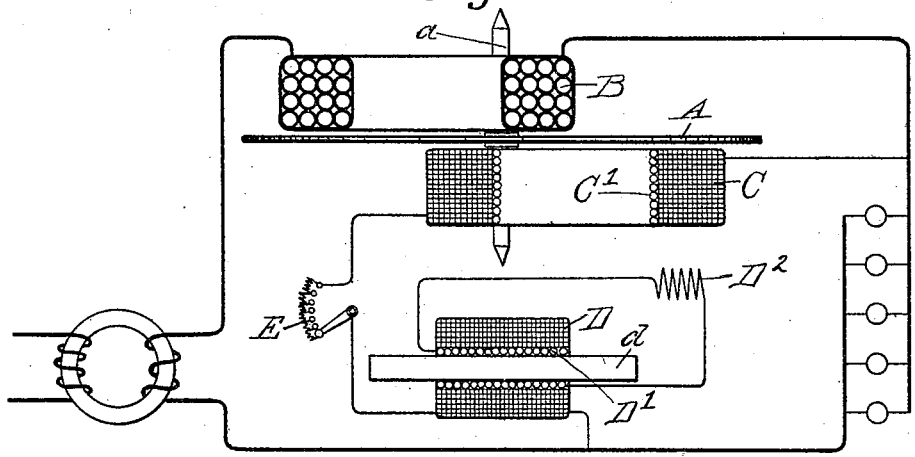

Owing to the practical difficulty of proportioning the parts in the first instance so as to give the exact result desired it will usually be found necessary to provide a suitable means of adjustment. For example, in Fig. 2 the core $d$ of the impedance-coil is provided with a keeper or armature $d'$, which by means of an adjusting-nut $d^2$ and space blocks $d^3$ of differing widths may be separated a greater or less distance from the poles of the core, and thus modify the retarding effect of the impedance-coil and consequently the phase of the current in the shunt-circuit. In this figure also the field-coils are shown as provided upon the inwardly-projecting poles of a core A', which extends around the armature. The volt-coils in Figs. 2 and 3 are but two in number and are wound upon the ends of a straight core within the armature. In Fig. 5 both the field and volt coils are exterior to the armature and inclose the latter, the core of the volt-coils being dispensed with. In Figs. 5 and 6 the invention is shown as applied to a meter having a disk armature, with the series and volt coils arranged eccentrically upon opposite sides of the disk, or above and below the same. In these figures and in Figs. 3 and 4 also the impedance-coil is provided with a movable magnetic core by which the adjustment hereinbefore referred to may be accomplished, and in Fig. 6 an adjustable resistance E is also provided in the shunt-circuit to the same end. Many other changes in detail and arrangement may obviously also be suggested without departing from the spirit of the broad invention.

I claim as my invention—

1. The combination in an electric meter, of the armature, series and volt coils inductively actuating the armature, an impedance-coil in the shunt-circuit with the volt-coil, a secondary volt-coil inductively energized from the primary volt-coil and coöperating therewith to produce a resultant flux acting on the armature, and a secondary impedance-coil inductively energized from the primary impedance-coil and serving to reduce the retarding effect of the latter.

2. The combination in an electric meter, of the armature, series and volt coils inductively actuating the armature, an impedance-coil in the shunt-circuit with the volt-coil, a secondary volt-coil inductively energized from the primary volt-coil and coöperating therewith to produce a resultant flux acting on the armature, a secondary impedance-coil inductively energized from the primary impedance-coil and serving to reduce the retarding effect of the latter, and adjusting devices for enabling the phase displacement of said resultant flux with relation to the electromotive force of the series circuit to be adjustably varied.

3. The combination in an electric meter, of the armature, series and volt coils inductively actuating the armature, an impedance-coil in the shunt-circuit with the volt-coil, a secondary volt-coil inductively energized from the primary volt-coil and coöperating therewith to produce a resultant flux acting on the armature, a secondary impedance-coil inductively energized from the primary impedance-coil and serving to reduce the retarding effect of the latter, and an adjustable resistance in the shunt-circuit.

In testimony that I claim the foregoing as my invention I affix my signature, in presence of two subscribing witnesses, this 6th day of January, A. D. 1898.

THOMAS DUNCAN.

Witnesses:
 EDWARD A. BARNES,
 JOHN E. DALTON.